United States Patent [19]
Byckling

[11] 4,365,256
[45] Dec. 21, 1982

[54] METHOD FOR ACCURATE CONTROL OF A LIGHT BEAM IN PHOTOTYPESETTING AND OTHER APPLICATIONS

[76] Inventor: Eero Byckling, Kimmeltie 13A 12, 02100 Espoo 10, Finland

[21] Appl. No.: 237,772

[22] Filed: Feb. 24, 1981

[30] Foreign Application Priority Data

Feb. 25, 1980 [FI] Finland ................................ 800543

[51] Int. Cl.[3] ....................... B41B 17/14; G06K 15/12
[52] U.S. Cl. ......................................... 346/108; 354/5
[58] Field of Search ............................. 346/108; 354/5

[56] References Cited

U.S. PATENT DOCUMENTS 3,701,999 10/1972 Congleton et al. ................. 354/5 X
3,703,137 11/1972 Anderson et al. ...................... 354/5
3,820,123 6/1974 Ammann ......................... 346/108 X
4,044,363 8/1977 Morgan .................................. 354/4

*Primary Examiner*—Donald A. Griffin
*Attorney, Agent, or Firm*—Lowe, King, Price & Becker

[57] ABSTRACT

The invention concerns a method to control accurately a light beam used for writing text or pictures in photo-type-setting and similar applications. Rulings or gratings consisting of slits or lines are attached to the image surface frame and in some realizations to the optics frame. The light beam and in some realizations one or several reference beams, separated from the write beam, are made to fall on the rulings or gratings. The signal observed by photodetectors from the rulings give information on the relative positions of the light beams, the rulings and the image plane. This information is translated by electronic circuits into information of the position of the write beam on the image surface. By means of feedback mechanisms this information allows one to control the position of the write beam accurately. Also the method of deflecting the beam can be so construed that the modulation of the beam can be synchronized to the deflection to allow accurate positioning of the picture elements to the required positions.

12 Claims, 5 Drawing Figures

METHOD FOR ACCURATE CONTROL OF A LIGHT BEAM IN PHOTOTYPESETTING AND OTHER APPLICATIONS

BACKGROUND OF THE INVENTION

This invention concerns a method that can be used to obtain great accuracy in writing text and pictures on a photosensitive surface with a light beam.

A light beam is used for writing in phototypesetting, preparation of printing plates, digital computer output, facsimile transmission, and in other tasks where one records pictorial or text material on a two-dimensional surface. When highly accurate output is required, a laser beam is employed, which results in high light intensity in a small spot. In this field, methods are previously known for the deflection and modulation of a laser beam in order to use it for writing. In these techniques, the control of the position of the beam is based on accurate mechanical motions and, in some solutions, on the signal given by a reference beam while it travels on a ruling. The required high accuracy, about 10,000–100,000 resolution elements in both dimensions on the image surface, cannot very easily be obtained in this manner.

SUMMARY OF THE INVENTION

In accordance with the invention, the position of a light beam is measured with particular rulings or gratings which consist of slits or lines. On the basis of these measurements, the position of the beam is accurately known during the writing, and thus the actual writing operation can be directed to the required position on the image surface. Position measurement in one direction on the image surface is based on deflecting the light beam using an appropriate technique over slits outside the image surface, and registering the position of the light beam on the edge of a slit. Because the motion of the light beam can be made to proceed repetitively and reproducibly, the position coordinate of the light beam in this direction can be be determined everywhere on the image surface. The position coordinate in the transverse direction to that discussed above, on the image surface, can be measured using another ruling consisting of slits or lines. Similarly, either the writing beam or a reference beam split from it falls on the ruling, and while the writing proceeds in the direction in question the beam on the ruling gives a signal indicating the position of the beam.

The invention as claimed herein offers a method in which the rulings outside the image surface provide accurate information on the instantenous position of the light beam on the image surface. This information is employed to control the writing process.

BRIEF DESCRIPTION OF THE DRAWING

The foregoing and other features and advantages of the present invention will be more readily appreciated upon reference to the following description of a preferred embodiment of the invention, when taken in conjunction with the accompanying drawings in which.

DETAILED DESCRIPTION OF A PREFERRED EMBODIMENT

Figure 1:
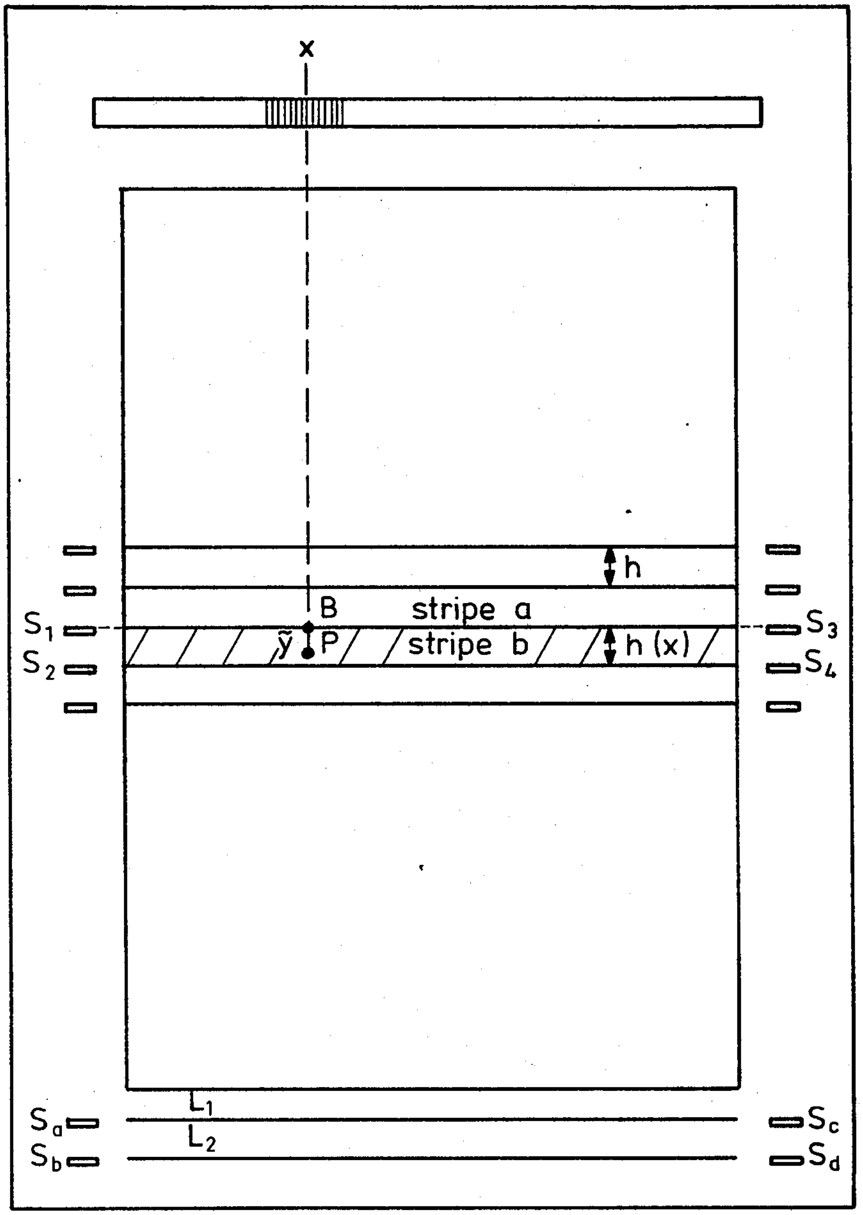
FIG. 1 illustrates an application of the inventive method to an image surface.

One implementation of the method is presented in FIG. 1. The image surface is exposed one stripe of height h at a time. When the light spot moves in the horizontal direction from left to right, it is simultaneously rapidly deflected in the vertical direction the distance h. When the beam is simultaneously modulated, all the text and picture material on the area of height h can be exposed. The total page is written by exposing a sufficient number of adjoining stripes one adjacent to the other. In this situation it is important that the stripes fit accurately to each other. The measurement and control of position is implemented as follows. When the beam is deflected to fall on a particular stripe (b in FIG. 1), and before the writing starts, a calibration is carried out. The beam is deflected in the vertical direction over the slits in the left upper and left lower corner of the stripe ($S_1$ and $S_2$ in FIG. 1). The drive voltage values of the deflector, the time values, or some similar information corresponding to the traversal of the beam over the upper edges of the slits $S_1$ and $S_2$, is registered. Then the beam is deflected to the right hand side of the image surface and the values corresponding to the slits in the right upper and right lower corner of the stripe ($S_3$ and $S_4$ in FIG. 1) are registered. Thus the position of the stripe has been measured with great accuracy. Because the measurement is carried out using the same beam that is used for writing, all the errors due to alignment errors and due to inaccuracy of the mechanical parts and mechanical motions are automatically compensated. Similarly, the inaccuracies and drift in the electronics which generate the vertical deflection will not cause errors in writing.

When the calibration and the error correcting calculations connected with the calibration have been carried out, the writing of the stripe in question (b in FIG. 1) may be started. The stripe is written by stroking vertical strokes of length h side by side from one end of the stripe to the other. For example, when exposing an area of the width of a newspaper page, the number of these strokes is about 16,000. For each stroke one has computed the voltage or time value which corresponds to the point on the upper boundary of the stripe (point B in FIG. 1). Similarly the position of the point on the lower boundary of the stripe has been computed. Thus the height of the stripe and the height of each picture element is known. Based on this information, the modulation of the light beam can be synchronized to the vertical deflection of the light beam so that each picture element is written accurately into the correct position. Especially one may note that the position of a lower boundary of a stripe (for example, the point B for the stripe a in FIG. 1) is measured using the same slits as in measuring the upper boundary of the next stripe (point B for stripe b in FIG. 1); that is using the slits on left and right edges of the image surface on the same level as the boundary. This indicates that the difficult problem of accurately joining together successive stripes is solved accurately and reliably.

In certain situations the distortion of the lens will cause the height of the stripe h, which corresponds to a fixed deflection voltage, to be larger towards the edges of the image surface than in the middle of the image surface. To correct this and certain other distortions, another calibration procedure may be included. Above or below the image surface area one sets up straight horizontal slits ($L_1$ and $L_2$ in FIG. 1) and edge slits ($S_a$, $S_b$, $S_c$, $S_d$ in FIG. 1) corresponding thereto. These are used to carry out a basic calibration of the device, e.g. once a day. The beam is positioned at the height of the slits $L_1$ and $L_2$ and the measurement of slits $S_a$–$S_d$ is first carried out as previously described. Thereafter the beam is deflected over the stripe between the slits $L_1$ and $L_2$ in the same manner as during the writing of a stripe. For each vertical stroke, or possibly for a suitably selected smaller number of strokes, the voltage or time value is registered which corresponds to the traversal of the beam over the slit $L_1$ and also over the slit $L_2$. Thus one obtains a basic calibration which is used when writing on the image surface and which accurately provides resulting straight upper and lower boundaries for a stripe on the image surface.

Figure 2:
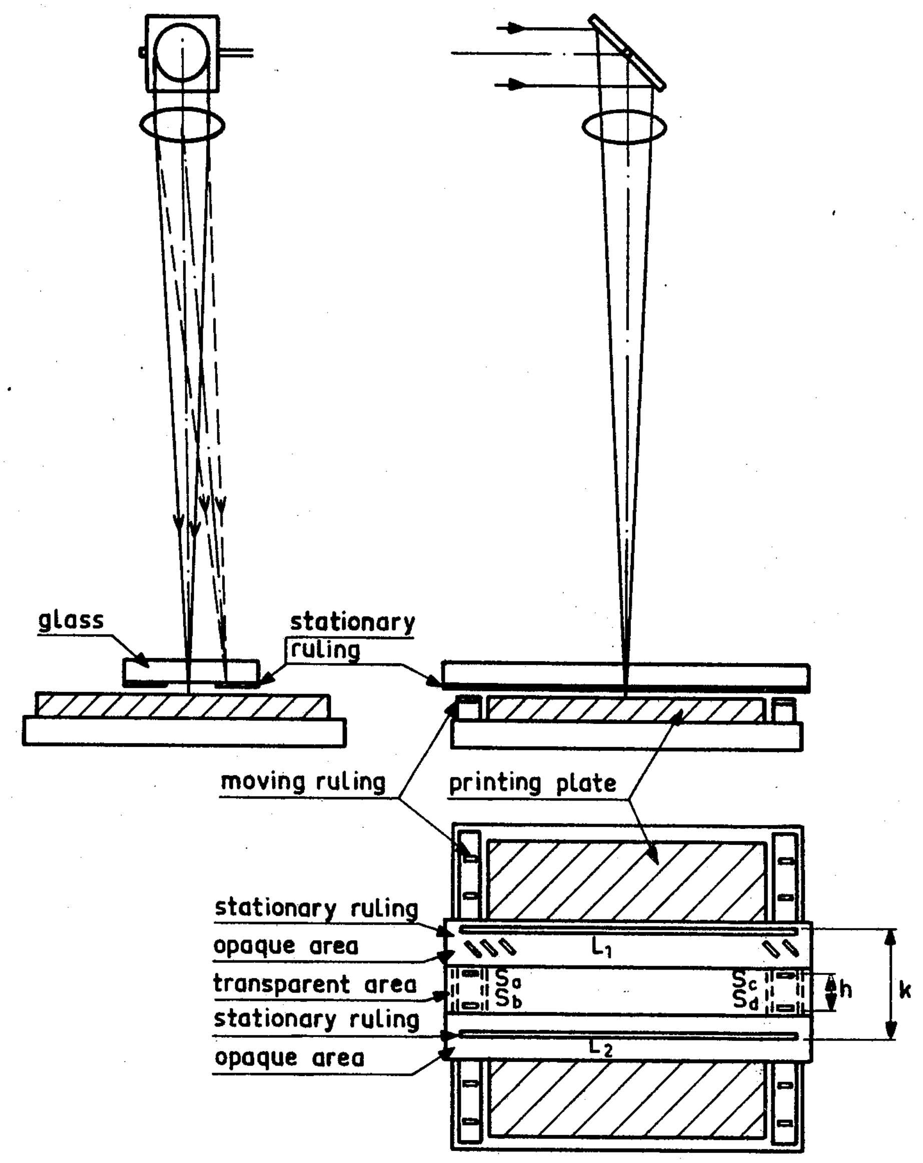
FIG. 2 shows an arrangement for determining coordinates on the image surface.

The measurement of position in the direction of the other dimension, that is in horizontal direction, is carried out using an appropriate ruling positioned horizontally and containing vertical slits or lines. One such possibility is to separate a reference beam from the writing beam, such that the reference beam travels along a ruling situated outside the image area. Such a ruling is depicted in the upper part of FIG. 1. A photodetector associated with the ruling will provide a signal which allows the determination of the horizontal x coordinate. A second possibility is to use the writing beam itself. One realization is given in FIG. 2. There the photosensitive image surface is moved to assure that the desired stripe will be positioned at the position of the writing beam. When the required stripe is at the correct position, the slits corresponding to this stripe (slits $S_a$–$S_d$ in FIG. 2) are used to calibrate the position measurement in the vertical direction. Further, when one carries out the actual writing, the horizontal slits ($L_1$ and $L_2$ in FIG. 2) are used for each vertical stroke to accurately control the vertical deflection. Now the position measurement in the horizontal direction can be carried out using an appropriate horizontal ruling. In FIG. 2 such a horizontal ruling consists of the short oblique slits below the slit $L_1$. The writing beam travels over the ruling composed of these oblique slits during each vertical stroke. A photodetector detects at what exact position the beam traversed the horizontal ruling and this signal thus gives the x-coordinate of the named vertical stroke. This method has the advantage that only one beam is needed, namely the writing beam. Thus the errors due to the difference between the pointing of the writing beam and the reference beam are eliminated.

Figure 3:
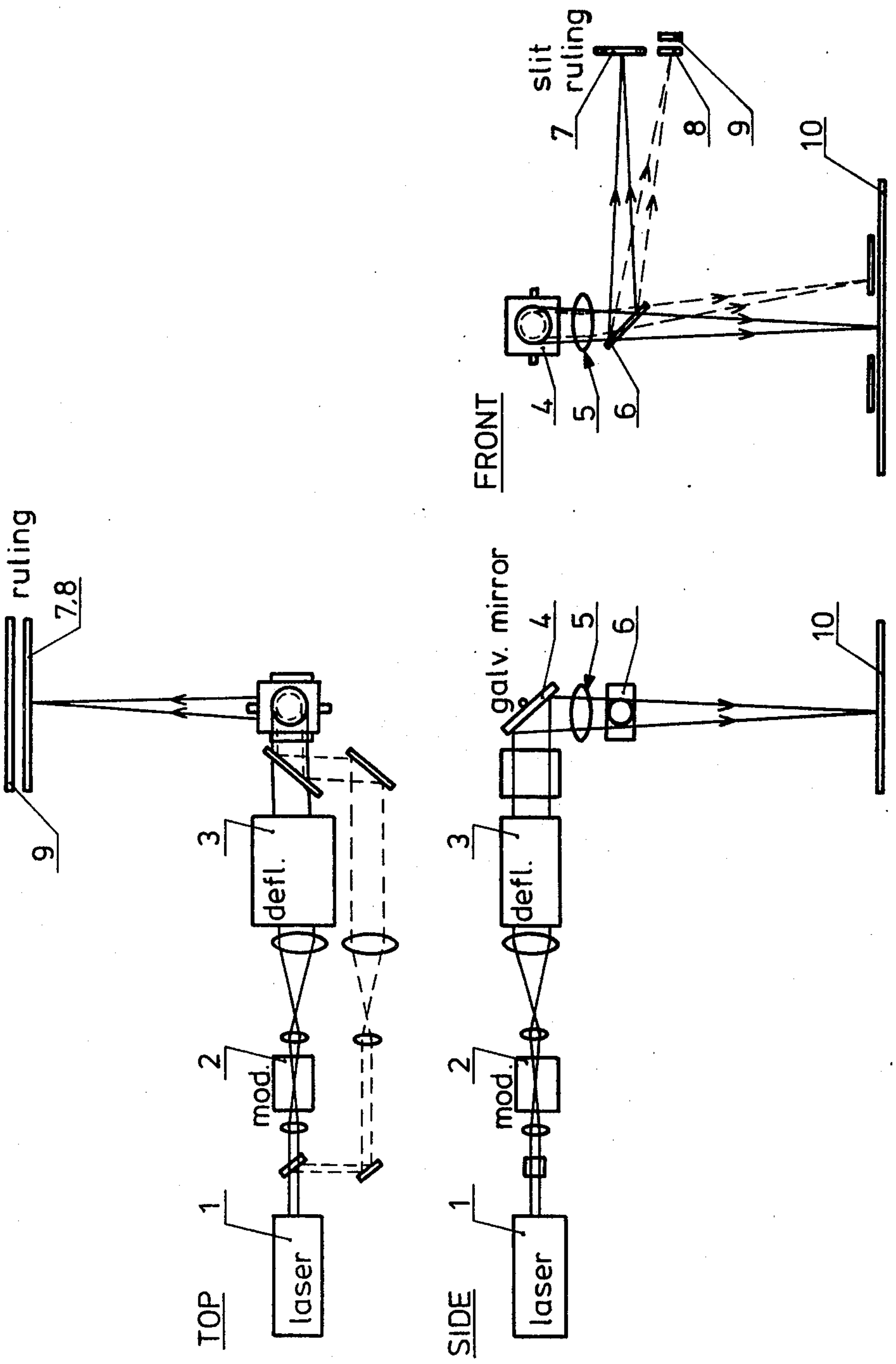
FIG. 3 shows three views of a system for positioning a beam in accordance with FIG. 1.

The method has been studied in the laboratory using an apparatus depicted in FIG. 3. It contains a laser (1) which emits a light beam towards the modulator (2), and an acousto-optic deflector (3) generates the vertical deflection of height h. Further along a beam is the galvanometer mirror (4) which generates the horizontal deflection across the image area. After this the beam travels through a focusing lens (5) and further through a partially reflecting beam splitter (6) which divides the beam into the writing beam and the reference beam. The reference beam falls on a ruling (7), consisting of two horizontal slits, which is used to determine accurately the vertical position and the vertical deflection velocity of the beam during each stroke. In FIG. 3 there is also drawn a second reference beam, using a dotted line, which is unmodulated and which falls on a horizontal ruling (8) and on the photodetector (9) behind it. This arrangement provides the signal for the continuous determination of the x-coordinate.

In a system of the type depicted in FIG. 3, an important feature is that, using an acousto-optic deflector, one can implement the vertical deflection electronically without moving mechanical components. One thus obtains a purely electronic control system for the positioning of the beam. The mechanical deflection, which is implemented using the galvanometer mirror (4), is allowed to run freely using an unchanging recurrent drive. The vertical deflection is synchronized with this freely running deflection in such a way that when the beam, measured on the ruling (8), has arrived at a correct x-coordinate value, the vertical deflection is started. This gives a correct x-coordinate value for each stroke, electronically controlled. Similarly, in the y-direction, the picture elements are positioned by measuring the y-coordinate of the beam and synchronizing the modulation of the beam so that each picture element is written at the moment when the beam has arrived at the correct y-position. Thus the position control in the y-direction is also carried out electronically and the manufacturing errors of the mechanical components do not affect the accuracy. One should also note that the position control is based on geometrical rulings which are easily manufactured to great accuracy and which can be quaranteed to retain their accuracy.

Figure 4:
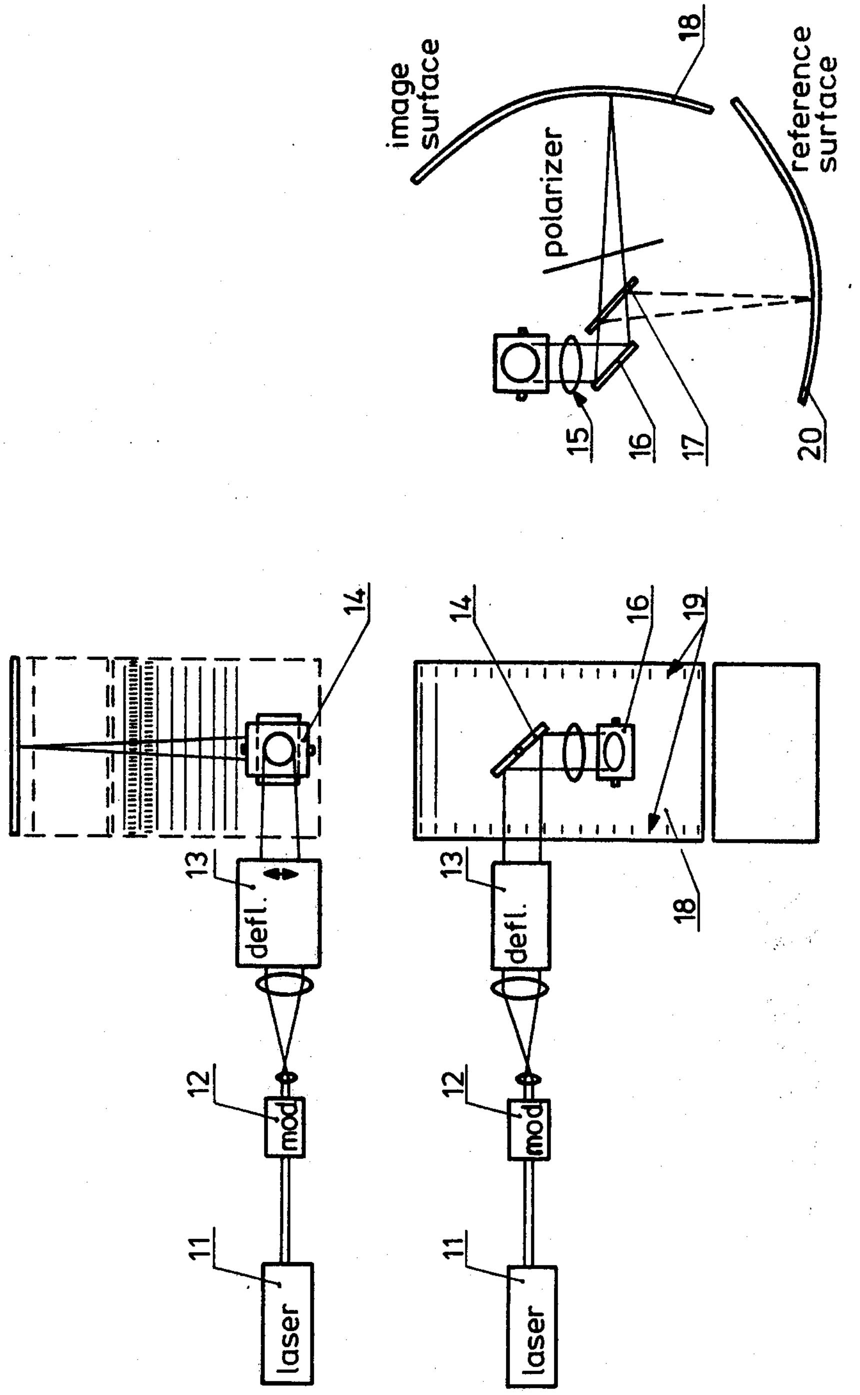
FIG. 4 shows three views of a system for preparation of images incorporating concepts of the present invention.

The proposed position measurement system allows one to build a device of the type presented in FIG. 4. The transition from a stripe to the next one is carried out by a second galvanometer mirror (16) which is situated after focusing lens (15). One then obtains essentially a random access device with respect to the vertical direction. The turning time for a galvanometer is of the order of tens of milliseconds and is to some extent independent of the turning angle. In any conventional system it is impossible to obtain such a random access operation, because the pointing accuracy of a galvanometer mirror is insufficient to reach a required writing accuracy. The position control system presented in this invention is, however, so fast and accurate, especially because it can use the writing beam for position measurement and it operates electronically, that the use of a galvanometer for random access becomes possible. A random access device is useful, e.g., in phototypesetting because now the text and pictures can be separately written at different times and one is not restricted to writing the whole page in fixed order, e.g. from upper left hand corner to lower right hand corner. The computer control of phototypesetting whole pages of mixed types of graphic elements thus becomes much easier.

Figure 5:
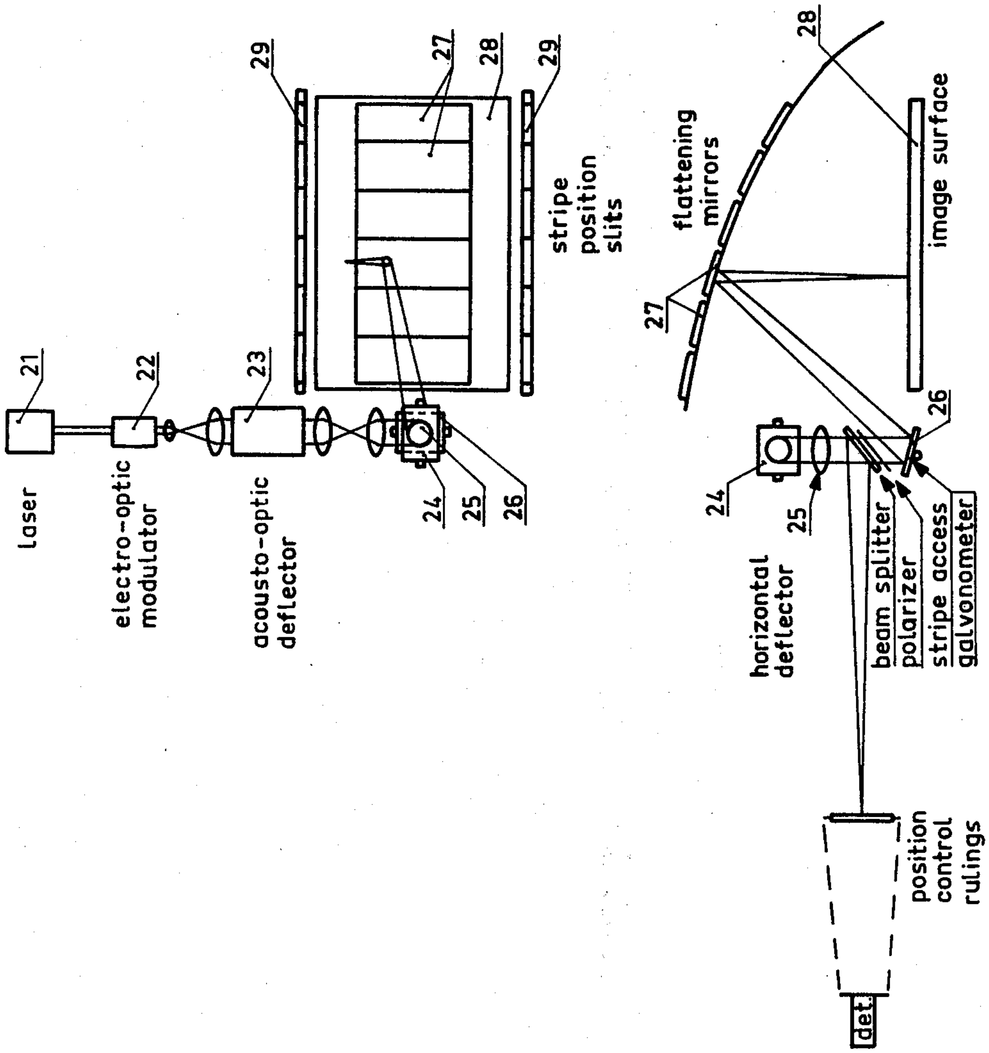
FIG. 5 shows a modification of the system of FIG. 4.

The system in FIG. 4 has the property that the image surface (18) of the lens is cylindrical. The axis of the cylinder is the axis of the galvanometer (16). In some applications it is important that the image surface be a plane. This is attained if the light beam is directed as in FIG. 5. After the latter galvanometer therein (26) there are provide a number of plane mirrors (27) which are positioned along a parabolic surface. By choosing the dimensions appropriately, one can accomplish the situation in which the following is true. If the light beam is directed towards the center of any one of the plane mirrors (27), the light beam is in focus on the planar image surface (28). Furthermore, it is clear that because the horizontal deflection galvanometer (24) and the acousto-optic vertical deflector are in front of the focusing lens, then for a flat field focusing lens the beam will remain focussed on the planar image surface irrespective of the deflection angle of the deflectors. The device of the type in FIG. 5 then provides the possibility to of writing on a large planar surface without physically moving the image surface and so that the above mentioned random access capability is retained.

The device which was built in the laboratory used as the laser an Argon-ion-laser with wavelength 488 nm. The beam was modulated using an acousto-optic modulator which had a bandwidth 8 MHz. The short vertical deflection was obtained using an acousto-optic deflector. The maximum deflection on the image surface was 8 mm and the vertical deflection time for one stroke was between 50 μs and 2 ms in the different experiments. The deflection angle of the horizontal deflection galvanometer was up to 30°, the random access time about 10 ms, and the horizontal deflection was 220–430 mm, depending on the focusing lens. The height of the stripes was 3.2 mm and the height of the total image area was 300–600 mm. On the left and the right boundaries of the image area there were rulings which were used for the measurement of the y-coordinate. These contained 50 μm wide slits at 3.2 mm intervals. The tolerance for the distance between the slits was ±2.5 μm. Outside the image surface was the x-coordinate measurement ruling, which consisted of identical transparent and opaque vertical lines, each of which was 25 μm wide. The tolerance for the lines was ±2.5 μm. The light transmitted through the vertical rulings was conducted to semiconductor detectors using light transmitting optical fibers. The light transmitted through the horizontal ruling was detected by a long-line optical detector. In addition, the device contained a slit line ruling of the type shown in FIG. 3, and the light behind this was observed by a photomultiplier detector. The electronics of the control circuit operated digitally. The device had a 32 MHz clock. Because the maximum vertical deflection velocity of the light beam was 200 μm/μs, the interval between two clock pulses corresponded to 6.25 μm.

The distances in the vertical direction were measured by counting the number of clock pulses observed from the time that the beam traversed a slit until it traversed another slit. Also by measuring the number of pulses observed between two slits with known distance, one could measure accurately the vertical deflection velocity. The various correction computations were carried out digitally. After these, the modulation of the light beam was controlled during each vertical deflection stroke by calculating the start time for each picture element and by generating a start signal at the moment when the clock indicated that the start time was on hand. The control in the x-direction was obtained by generating a start signal for the vertical deflection each time that a boundary between a transparent and opaque line on the horizontal ruling was crossed, that is, at 25 μm intervals. The position measurement and control accuracy of the system over the total image area was of the order of the resolution 6.25 μm.

Depending on the use, the proposed position control method can be implemented in a more or less complete version. If, for example, the horizontal deflection galvanometer is of sufficiently high quality and the required position accuracy is not more stringent than what is obtained from the galvanometer, then one of the vertical rulings is not needed. The calibration is then carried out only in the left hand side of the image surface before the writing operation and the operating speed of the device increases. The necessity of the horizontal lines $L_1$ and $L_2$ is also dependent on the accuracy requirements. If the application is highly critical then, in addition to the vertical position measurements, the horizontal position of the image surface must be measured even more accurately by attaching a long narrow straight vertical line to the image surface and registering a voltage or time value corresponding to the moment when the writing beam traverses this line. A highly accurate measurement of the x-coordinate is obtained by combining this type of arrangement and the x-position measurement system by using the writing beam that was described in connection with FIG. 2.

One embodiment of the invention is obtained in the case that the height of the stripe is only one picture element. In this case the vertical position measurement can be carried out using only one horizontal slit or line with length larger than the width of the image area. A preferred implementation is to split off a reference beam from the writing beam and make this reference beam fall on the ruling consisting of the long horizontal slit or line. The amount of light transmitted by a slit or reflected by a line will then depend on the relative position of the edge of the slit or line and the light beam. A deflector, e.g. an acousto-optic deflector, piezoelectric mirror, galvanometer, or a similar device, is then used to change the pointing direction of the light beam so as to correct the errors observed by means of the ruling and to obtain accurate vertical position during writing. In this case the horizontal position can be measured by means of the same reference beam or by means of another reference beam. In the former case, the ruling consisting of the horizontal slit or line for vertical position measurement must have some additional structure, which depends on the x-coordinate and can be used for x-position measurement. An example of such is a Ronchi-ruling consisting of short vertical lines superimposed on the long horizontal line. When separate reference beams are used for horizontal and vertical measurements, each of the necessary two rulings may have simpler structure than a combined ruling.

What I claim is:

1. A method for controlling a light beam writing information on an image surface comprising the steps of:

writing the information by using at least one deflector for deflecting the light beam over the image surface;

using rulings, comprising a plurality of lines and situated in the vicinity of the writing area of the image surface, for measuring two-dimensional position coordinates of the beam on the surface;

deflecting a light beam along a ruling during the writing step and measuring a signal resulting from said deflection, the signal depending on the position of the lines; and determining the two-dimensional instantaneous coordinates of the beam on the surface using the signal measured during the writing step.

2. A method as claimed in claim 1, wherein the step of writing over the image surface comprises the step of writing one stripe at a time a sufficient number of stripes, adjacent to each other, to fill the image surface, and the step of writing one stripe comprises the steps of deflecting the light beam across the stripe with strokes, the length of which is approximately the same as the width of the stripe, and moving the light beam simultaneously at a lower velocity along the length of the stripe such that an accurate joining of adjacent stripes and position control over the area of a stripe is carried out by the steps of deflecting the beam across ruling lines and registering the signal which depends on the position of the lines, and using this signal to control the modulation of the beam during the strokes in such a way as to cause the writing to be positioned at the correct position of the image surface.

3. A method as claimed in claim 2, comprising the steps of electronically triggering the said strokes across the stripes and controlling the position of picture elements written along the length of the said stripes by measuring the magnitude of the slower deflection and triggering the faster deflection stroke at the moment when the slower deflection has proceeded a required distance.

4. A method as claimed in claim 2, comprising the further steps of generating picture elements to be written during the stroke across the stripe by comparing the amount of the deflection of the light beam to computed values, by synchronizing the writing time interval to each picture element to coincide with the interval obtained from the computation, and by modulating the beam such that the position of the picture element is controlled by said comparing and synchronizing steps.

5. A method as claimed in claim 2, comprising the further steps of allowing the light beam, during each stroke, to fall on at least one rulling and using the information obtained in this manner during the stroke about the position of the beam to control the modulation of the beam so that the picture elements fall accurately into correct position.

6. A method as claimed in claim 2, comprising the step of using an acousto-optic deflector to carry out deflection of the light beam across the stripe.

7. A method as claimed in claim 2, comprising the further step of pointing the light beam towards each stripe by causing the light beam to be reflected from a mirror, rotating the mirror to cause the light beam to fall on the required stripe, wherein the step of measuring the position of the beam is carried out by using a light beam reflected from the same rotating mirror.

8. A method as claimed in claim 7, wherein the writing step is carried out on a planar surface and comprising the further step of situating a point on each of a plurality of planar mirrors, disposed after the rotating mirror used for selecting the required stripe, so that if the light beam passes by this point, the light beam will be focussed on the planar image surface.

9. A method as claimed in claim 1, comprising the further steps of moving the optical elements and the image surface with respect to each other during the writing step and deflecting the light beam both across ruligs connected to the optical elements and across rulings connected to the image surface, to enable determining the relation between these two coordinate systems which move with respect to each other and using this relation to control the writing beam falling on the image surface so that it writes in the correct position.

10. A method as recited in claim 1 further comprising the step of performing a calibrating step prior to said writing step, in which an electronic signal for controlling the deflection of the beam is calibrated, said calibrating step including the step of causing the beam to move across at least one ruling line to determine a relation between the resulting signal and the position of the beam, and wherein said step of determining the two dimensional coordinates of the beam includes the step of using the relation between the resulting signal and beam position to determine the beam coordinates during the writing step.

11. Apparatus for controlling a light beam to write picture elements on an image surface comprising means for writing a sufficient number of adjacent stripes, one stripe at a time, to fill the image surface, including means for deflecting the light beam across the stripe, having therein means for causing said light beam to deflect in a plurality of strokes having lengths approximately equal to the width of the stripe and means for simultaneously moving the light beam along the length of the stripe at a velocity lower than that provided thereto in said strokes, means for measuring two-dimensional position coordinates of the beam on the image surface, including a plurality of rulings situated in the vicinity of the writing area of the image surface, as a function of signals, which themselves are functions of positions of indicia in said rulings, and means for deflecting the light beam along a ruling while writing on the surface and for providing said signals to said means for measuring two-dimensional position coordinates;

said means for deflecting including means for deflecting said beam across said ruling indicia, for registering the resulting signal, and for modulating the beam during said strokes responsive thereto so as to cause the writing to be positioned correctly on the image surface.

12. An apparatus as recited in claim 11 wherein said means for deflecting said light beam comprises rotating mirror means for directing said light beam to a predetermined stripe and a curvilinear mirror, comprised of a plurality of planar mirrors each having a point so situated that a light beam reflected thereby is focused on a planar image surface.

* * * * *